Jan. 16, 1962 L. E. SCHUTT 3,016,919
OPERATOR FOR CONVERTIBLE TOPS
Filed July 13, 1960 2 Sheets-Sheet 1

INVENTOR.
LESTER E. SCHUTT
BY
M T Murphy
ATTORNEY

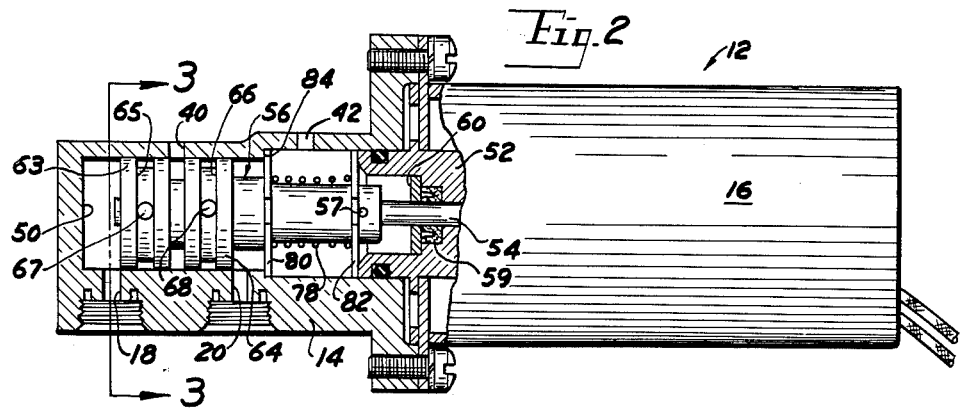

3,016,919
OPERATOR FOR CONVERTIBLE TOPS
Lester E. Schutt, Dearborn, Mich., assignor to Dura Corporation, Oak Park, Mich., a corporation of Michigan
Filed July 13, 1960, Ser. No. 42,689
2 Claims. (Cl. 137—621)

This invention relates to actuating mechanism for an hydraulic automobile convertible top or other accessory.

The principal object of the present invention is the provision of a compact and reliable actuating mechanism of the type mentioned which includes a control valve having novel structure and is intended and adapted for use in combination with the hydraulic circuit for the power steering unit of the automobile.

The above and related objects of the present invention will become apparent during the course of the following description taken in conjunction with the accompanying drawings.

In the drawings:

FIG. 2 is an enlarged view of the control valve of said mechanism with parts in section and in elevation, the control valve being shown in its neutral position;

FIG. 3 is a vertical sectional view of the structure of FIG. 2 taken along the line 3—3 thereof;

FIG. 4 is a rotated sectional view of the structure of FIG. 3 taken along the line 4—4 thereof;

FIGS. 5 and 6 are views similar to FIG. 4 with the valve spool of the control valve in opposite extreme positions; and FIG. 7 is a schematic view of said mechanism in combination with the power steering unit of the automobile.

Figure 1:
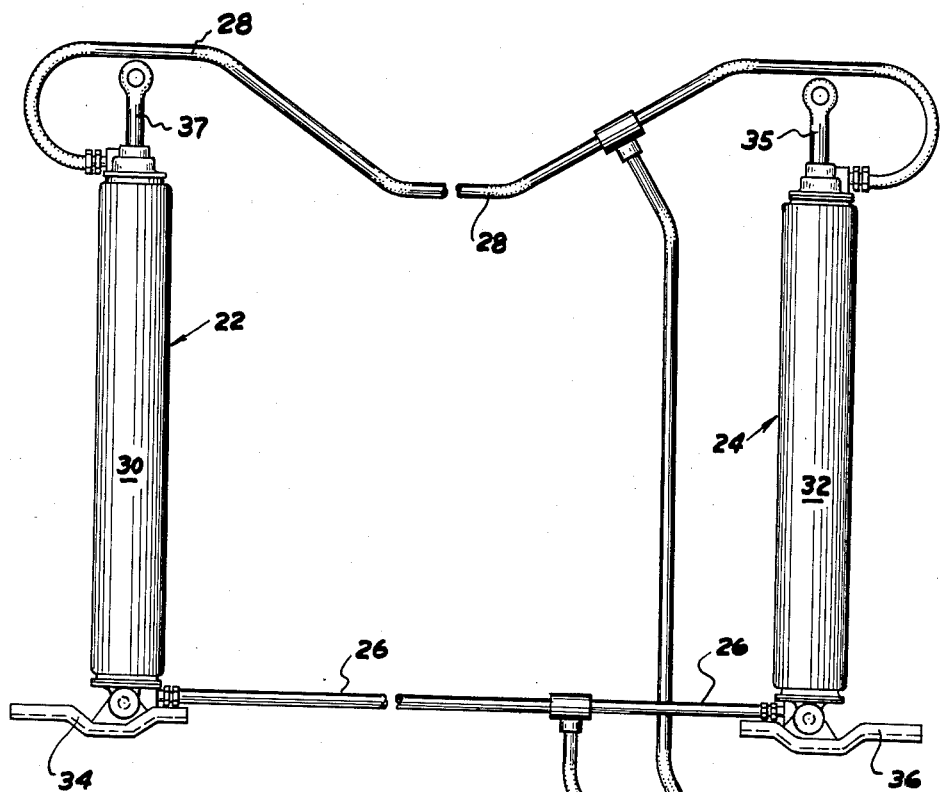
FIG. 1 is a view of an hydraulic automotive convertible top actuating mechanism embodying the present invention showing the essential parts thereof in elevation.
Figure 1:
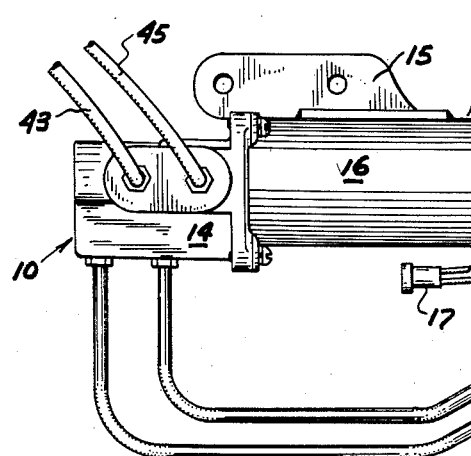

Referring to the drawings in greater detail and first to FIG. 1, 10 generally designates a control valve which is actuated by a solenoid indicated at 12 and the two are bolted together as shown by way of the flange on the valve housing which is designated 14 and mounted at a convenient location on the automobile by means of the bracket 15 attached to the solenoid housing 16 from which location the solenoid may be remotely energized by suitable electrical circuitry not shown to which said solenoid is connected by the electrical connector 17 extending from the rear of the solenoid housing 16. The valve housing has a pair of load ports 18 and 20 FIG. 2 across which are connected by conduits 19 and 21 a pair of hydraulically powered cylinder and piston units generally designated 22 and 24 serving as reversible hydraulic load devices for the control valve 10. The opposite ends of the units 22 and 24 are commonly connected by conduits 26 and 28 respectively joined to the conduits 19 and 21 and which, by suitable porting in the cylinders of the units, lead to the corresponding cylinder bore on opposite sides of the piston therein (not shown); the cylinders of the units 22 and 24 being respectively designated 30 and 32. The cylinders 30 and 32 are pivotally mounted on brackets as shown and indicated at 34 and 36 which are attached to the automobile body in a manner such that the piston rods 37 and 35 for said pistons may be secured to the linkage for the convertible top each at one side so that the top may be raised and lowered commonly by the units 22 and 24. The valve housing 14 has a pair of line ports 40 and 42 to which are connected conduits 43 and 45, respectively, and in the particular embodiment of the control valve shown the construction is such that the port 40 is designed for connection to the pressure side and the port 42 to the return side of a hydraulic pressure source. As shown in the schematic view of FIG. 7 the control valve 10 is in series in the hydraulic circuit of the automobile power steering unit for converting the unidirectional flow therein to a bidirectional power source for the units 22 and 24. The power for said circuit, which includes the units therein designated in addition to said control valve, is taken from the pulley 46 for the fan 48 as is conventional.

Referring now to FIGS. 2–6, the valve housing 14 has a bore 50 which is blind ended at one end thereof and open at the flanged end of the valve housing. The bore 50 is sealed at its open end as shown by a member 52 which projects into this end of the bore from the solenoid. The member 52 slidably carries the solenoid plunger indicated at 54 which is connected to an extension of the valve spool, generally designated 56, of the control valve by a pin 57 extending through the ends of the two parts as shown. A gland 59 seals the plunger 54 in the member 52 behind a plate 60 which limits the travel of the valve spool 56 in one of its extreme positions as shown in FIG. 5 and as will be described. The valve spool 56 has a pair of spaced lands 63 and 64 and a central bore 65' within it. Each land has an annular groove on it and a transverse passageway in the form of a cylindrical aperture communicating the central bore 65' to the groove, the transverse passageway intersecting the central bore and being disposed on opposite sides thereof. The annular grooves on the lands 63 and 64 are indicated at 65 and 66, respectively, and the transverse passageways at 67 and 68. Each land has extending through it a pair of longitudinal passageways in the form of circumferential slots disposed on a diameter between the central bore 65 and the groove on the land. The longitudinal passageways in the two lands 63 and 64 which are designated 69 and 70 are in registry. As can be seen from a comparison of FIGS. 2 and 3 the transverse passageway in each land and the pair of longitudinal passageways are non-intersecting, i.e., the axis of the transverse passageway in each land is disposed at right angles to the diametric plane which symmetrically intersects the pair of longitudinal passageways through the land. The central bore 65' within the confines of the lands 63 and 64 is reduced in diameter in reference to the bore 67' within the extension of the valve spool 56 that is connected to the solenoid plunger 54 and at the shouldered junction of the two bores is disposed a seat 71 for a ball check 72 which is yieldably urged by a compression spring 73 in the direction of the bore 65' to seal it off from the housing bore 50 so long as the pressure in the bore 65' does not exceed a predetermined maximum. The spring 73 operates against the check 72 and a plate 75 which abuts the solenoid plunger end. Access to the bore 67' is provided by an aperture 76 in the valve spool extension to maintain the check valve operative when the valve spool 56 is in the extreme position previously mentioned and shown in FIG. 5.

The valve spool 56 is yieldably centered in a neutral position in the housing bore 50 which is shown in FIG. 4 and the means to accomplish this includes a compression spring 78 which is concentrically disposed about the extension of the valve spool on the outside thereof and which operates between two centrally apertured washers 80 and 82 slidably carried on said extension. The washer 82 abuts the member 52 and the washer 80 abuts a radial shoulder 84 formed in the housing bore 50 beyond the ports therein as shown and the two washers coact with the compression spring to limit the travel of the valve spool 56 in opposite directions and hence center it in the position shown for it in FIG. 4. This position of the spool 56 corresponds to the de-energized condition for the solenoid 12 and if the solenoid switch to raise the convertible top is depressed the solenoid will pull the plunger 54 into the solenoid housing 16 and carry the valve spool 56 to the extreme position shown for it in FIG. 5. The spring 78 will be compressed during this travel of the spool from its end which abuts the washer 80 which is carried with the spool by a radial shoulder 86 formed on it. So long as the solenoid remains energized to raised position, the spool will be held in the position shown for it in FIG. 5 but as soon as the solenoid is de-energized the spring 78 acting against the washer 80 which in turn acts against the shoulder 86 returns the spool to its neutral position shown in FIG. 4. The spool is actuated to its other extreme position shown in FIG. 6 from its neutral position when the solenoid is energized with opposite polarity as by depression of its switch to lower the convertible top in which instance the plunger 54 will be pushed out of solenoid housing 16 to move the spool against the blind end of the housing bore 50 which limits its travel. The travel of the spool 56 in this direction is also against the urging of the compression spring 78 which is compressed from its end operating against the washer 82 which is carried with the spool by the projecting ends of the connecting pin 57 already mentioned and as long as the solenoid remains so energized the spool will remain in the extreme position shown for it in FIG. 6. As soon as the solenoid is de-energized the spool will again be actuated to its neutral position by the stored energy in the spring 78 which acts against the washer 82 which in turn acts against the pin 57.

In operation of the mechanism described assuming that the line port 40 is connected to the pressure side of an hydraulic pressure source and the line port 42 to the return side of the same source such as shown in FIG. 7 in which the mechanism is combined with the power steering hydraulic circuit and from which it is apparent that the conduits 43 and 45, respectively joined to said ports, are so connected and further assuming that the spool 56 is in its neutral position corresponding to the de-energized condition of the solenoid, then the two line ports 40 and 42 are interconnected by the longitudinal passageway 70 in the land 64, the space between the two lands and the return line port 42 being connected in this position of the spool as shown. The annular groove on each land is sealed off in this position of the spool and hence also is the spool bore 65' and each load port is connected with the interconnected line ports. The load port 18 is connected with the pressure line port 40 through the longitudinal passageway 69 in the land 63 and the load port 20 is directly connected to the return line port 42 around the extension of the spool. The pressure of the hydraulic fluid which completely surrounds the spool externally of the spool bore 65' and the interconnecting annular groove on each land is uniform throughout the housing bore 50 and is equal at the load ports 18 and 20. Hence there is no load on the power steering hydraulic circuit and the piston in each of the cylinder and piston units 22 and 24 is freely positionable in its respective cylinder by virtue of the balanced pressures across it. This means that the convertible top can be manually raised and lowered in this position of the spool of the control valve 10. If it is desired to raise the top by the mechanism provided, the spool 56 is actuated from its neutral position to the extreme position for it shown in FIG. 5 in the manner already described and in this position of the spool the pressure line port 40 is connected with the annular groove 65 on the land 63 and the load port 20 is connected with the annular groove 66 on the land 64. Pressure fluid in the conduit 43 then enters the pressure line port 40 and passes out the load port 20 through the transverse passageway on each land and through the central bore 65' into the conduit 19 to the lower ends of the cylinders 30 and 32 of the units 22 and 24 to commonly raise the respective pistons moving their piston rods connected to the linkage of the convertible top out of the cylinder bores to raise said top. The return fluid on the opposite side of each piston leaves the top of the cylinders 30 and 32 and enters the common conduit 28 to be conducted to the load port 18 by the conduit 21. The load port 18 in this extreme position of the spool 56 is connected to the return line port 42 through the longitudinal passageways 69 and 70 in both lands and the return fluid entering the load port 18 follows this path through the return line port 42 into the conduit 45. The differential pressures thus produced across each piston position it in the top end of the corresponding cylinder of the units 22 and 24 to raise the top or keep it raised as long as the solenoid remains thusly energized. When the solenoid is de-energized the spool is returned to its neutral position. If it is desired to lower the top, the spool is actuated from its neutral position to the extreme position for it shown in FIG. 6 as before described and in this position of the spool the pressure line port 40 is connected with the annular groove 66 on the land 64 and the load port 18 is connected with the annular groove 65 on the land 63. The other load port 20 is directly connected with the return line port 42 around the extension on the spool. In this position of the spool, pressure fluid in the conduit 43 passes through the control valve from the pressure line port 40 to the central bore 65', through it and out of it, by the transverse passageway in each land to the load port 18 and from there is conducted to the top end of the cylinders 30 and 32 of the units 22 and 24 by the conduits 21 and 28 to lower the convertible top. The return fluid on the opposite side of each piston is conducted to the load port 20 by the conduits 26 and 19 and through the control valve directly to the return line port 42. Each piston is positioned in its lowered position in its respective cylinder by the differential pressures across it in this extreme position of the spool as long as the solenoid remains so energized. Upon de-energization of the solenoid the spool is returned to its neutral position as hereinbefore described. It should be noted that in each of the two extreme positions of the spool 56, the central bore 65' is filled with pressure fluid while the bore 67' within the extension of the spool is filled with return fluid, the access aperture 76 through the extension walls providing for this, and if the load on the control valve increases inordinately, as for example by an obstruction in raising or lowering the top, the resultant increase in the pressure of the fluid in the bore 65' if it exceeds a predetermined maximum will move the ball check 72 off its seat 71. The pressure fluid will bypass the units 22 and 24 and be conducted directly to the return line port 42, the pressures in the two bores and across the load pistons tending to equalize in this event. The predetermined maximum pressure at which the check valve will be operative is built into the control valve by the spring characteristics of the compression spring 73, the porting in the valve and other factors having in view the characteristics of the power steering hydraulic circuit with which said mechanism is combined.

It will thus be seen that there has been provided by the present invention an hydraulic automotive convertible top actuating mechanism in which the object hereinabove set forth together with many thoroughly practical advantages has been successfully accomplished. While the preferred embodiment of the invention has been shown and described in connection with an hydraulic top actuator it is to be understood that various modifications and changes may be resorted to and other accessories on the motor vehicle may be actuated without departing from the spirit of the invention or from the scope of the appended claims.

What is claimed is:

1. In a hydraulic automotive convertible top actuating mechanism having a hydraulically powered cylinder and piston unit for raising and lowering said top, a control valve for controlling said mechanism, said valve comprising a housing having a bore, said housing having pressure and return line ports and a pair of load ports, each port communicating the housing bore to the outside of the housing, a valve spool slidable in the housing bore, yieldable means centering the valve spool in a neutral position in the housing bore, means for actuating the spool to an extreme position in the housing bore from said neutral position, the structure of the spool including a bore within it and a pair of lands having a space therebetween, each land having a groove on it and a passageway communicating the spool bore to the groove, each land having another passageway through it, the extreme position of the spool connecting one of the line ports and the groove on one land and connecting one of the load ports and the groove on the other land, the extreme position of the spool also connecting the other line port and the other load port through said other passageways in both lands, said piston being positioned in a corresponding extreme position by a differential pressure across it in said extreme position of the spool, the neutral position of the spool connecting said one line port and the space between the lands and closing off each groove and the spool bore and interconnecting the line ports through said other passageway in said other land, the neutral position of the spool also connecting each load port with the interconnected line ports, said one load port being connected directly with said other line port, said other load port being conected with said one line port through said other passageway in said one land, said piston being freely positionable by virtue of the balanced pressures across it in said neutral position of the spool.

2. An electro-hydraulic control valve for a hydraulic automotive convertible top actuating mechanism comprising a valve housing having a blind ended bore opening to one end thereof, a solenoid housing attached to the valve housing at its one end, a member extending from the solenoid housing into the valve housing bore for sealing the open end of the same, a solenoid plunger slidably carried in said member and extending into the valve housing bore, a valve spool slidable in the valve housing bore, a radial shoulder in the valve housing bore, a compression spring centering the valve spool against said shoulder and said member in a neutral position in the valve housing bore, said valve spool having a pair of spaced lands and an extension projecting from the lands, means fixedly connecting said extension and said plunger so that said valve spool is actuated to opposite operative positions in the valve housing bore from said neutral position, a pair of members operating at opposite ends of said spring slidably carried on said extension and alternately moveable with said valve spool each toward the other against the urging of the spring in its movement from said neutral position to said operative positions, said valve spool having a central bore within it, each land having an annular groove on it and a transverse passageway in it communicating its annular groove and said central bore, each land also having a longitudinal passageway through it between the central bore and its groove, the longitudinal passageways on the two lands being in registery, and a ball check valve within said extension closing off said central bore from the valve housing bore, and means providing access for the fluid in the valve housing bore to the interior of said extension in both operative positions of the valve spool in the valve housing bore.

References Cited in the file of this patent
UNITED STATES PATENTS

| | | |
|---|---|---|
| 1,775,856 | Hauser | Sept. 16, 1930 |
| 2,403,325 | Armington | July 2, 1946 |
| 2,594,664 | Livers et al. | Apr. 29, 1952 |
| 2,596,242 | Hill | May 13, 1952 |
| 2,604,075 | Naud | July 22, 1952 |
| 2,708,344 | Greer | May 17, 1955 |
| 2,952,127 | Parsons | Sept. 13, 1960 |